United States Patent [19]
Mimura et al.

[11] Patent Number: 5,945,042
[45] Date of Patent: Aug. 31, 1999

[54] METHOD FOR CONTINUOUSLY FORMING AN ARRAY OF OPTICAL ELEMENTS AND APPARATUS THEREFOR

[75] Inventors: Ikuo Mimura; Keiji Adachi, both of Sano, Japan

[73] Assignee: Nippon Carbide Kogyo Kabushiki Kaisha, Tokyo, Japan

[21] Appl. No.: 08/860,418
[22] PCT Filed: Oct. 21, 1996
[86] PCT No.: PCT/JP96/03038
 § 371 Date: Jun. 24, 1997
 § 102(e) Date: Jun. 24, 1997
[87] PCT Pub. No.: WO97/15435
 PCT Pub. Date: May 1, 1997

[30] Foreign Application Priority Data

Oct. 24, 1995 [JP] Japan ................................. 7-298850

[51] Int. Cl.⁶ .................................................. B29D 11/00
[52] U.S. Cl. .......................... 264/1.6; 264/1.9; 264/2.7; 264/284; 425/373; 425/385
[58] Field of Search .............. 264/1.6, 1.9, 2.7, 264/284, 235, 346; 425/373, 385, 404, 384

[56] References Cited

U.S. PATENT DOCUMENTS

| | | | |
|---|---|---|---|
| 3,146,492 | 9/1964 | Lemelson | 264/1.6 |
| 4,332,847 | 6/1982 | Rowland | 264/1.6 |
| 4,576,850 | 3/1986 | Martens . | |
| 4,601,861 | 7/1986 | Pricone et al. | 264/1.6 |
| 5,656,209 | 8/1997 | Benz et al. | 264/1.6 |

FOREIGN PATENT DOCUMENTS

WO93/13929  7/1993  WIPO .................................. 264/1.6

Primary Examiner—Mathieu D. Vargot
Attorney, Agent, or Firm—Sherman and Shalloway

[57] ABSTRACT

This invention provides a method for continuously forming an array of optical elements which includes feeding synthetic resin sheeting having a temperature in the flow temperature region of the synthetic resin directly to a thermoforming zone of embossing means; continuously pressing the sheeting against a mold provided on the embossing means and having a pattern for defining an array of optical elements while maintaining the sheeting at that flow temperature, to bring the sheeting into intimate contact with the mold and thereby form an array of optical elements on one surface of the sheeting; laminating a surfacing film to the side of the sheeting opposite to the mold as required; feeding a carrier film to the side of the resulting laminate opposite to the mold and bringing the carrier film into close contact therewith; and cooling the sheeting to a temperature lower than the glass transition temperature of the synthetic resin, as well as apparatus therefor.

12 Claims, 3 Drawing Sheets

METHOD FOR CONTINUOUSLY FORMING AN ARRAY OF OPTICAL ELEMENTS AND APPARATUS THEREFOR

TECHNICAL FIELD

This invention relates to a method for continuously forming an array of optical elements such as cube-corner prisms, linear prisms, lenticular lenses, refractive lenses, Fresnel lenses, linear Fresnel lenses or hologram patterns, on sheeting such as synthetic resin sheeting, and apparatus therefor. More particularly, it relates to a method for continuously forming an array of cube-corner type microprisms which is useful in the production of cube-corner type retroreflectors (i.e., articles reflecting most of the incident light back toward the light source), and apparatus therefor.

BACKGROUND ART

Conventionally, many propositions have been made with respect to the production of synthetic resin optical sheeting comprising synthetic resin sheeting provided on a surface thereof with an array of various optical elements as described above.

In the production of such synthetic resin optical sheeting, highly precise processing is required because the shape accuracy of the optical elements determines its optical performance, as contrasted with general processing techniques for synthetic resins, such as so-called embossing, graining and satinizing. For example, in the case of so-called microprism type retroreflective sheeting comprising synthetic resin sheeting provided with an array of cube corners, the angular divergence of the bundle of retroreflected light will become too great for practical purposes even if the three mutually perpendicular faces constituting each prism is deviated during forming, for example, by about 1°.

In order to overcome this disadvantage, various attempts have been made to improve the method of forming an array of optical elements on a surface of synthetic resin sheeting. Several patents disclosing techniques for the production of synthetic resin optical sheeting are described below.

In Rowland U.S. Pat. No. 3,689,346, there is described a method for continuously producing cube-corner type retroreflective sheeting. According to this method, retroreflective sheeting is produced by depositing a curable molding material upon a cube-corner mold and applying a transparent, flexible film material over the molding material, after which the molding material is cured and bonded to the film material. However, the resins specifically described in this patent for use as molding materials are substantially limited to crosslinkable resins such as plastisol type vinyl chloride resin containing a crosslinking acrylic ester monomer. Although it is suggested that some resins in a molten state can be used, no specific description is given of the melt viscosity conditions, heating conditions and cooling conditions under which such a resin can be embossed to obtain a product having high shape accuracy.

In Rowland U.S. Pat. No. 4,244,683 (corresponding to Japanese Patent Publication No. 51320/'81), there is disclosed an apparatus and method (i.e., a so-called progressive pressure forming method) for semi-continuously embossing thermoplastic synthetic resin sheeting to form cube-corner prisms on one surface thereof. In this patent, it is described that prism elements are formed by placing a series of flat embossing molds on one surface of synthetic resin sheeting traveling on an endless belt having a smooth surface, and pressure-forming the sheeting successively in three types of press stations (i.e., a preheating station, a thermoforming station, and a plurality of cooling stations). However, the prism sheeting produced by this method shows seams distinctly owing to the use of juxtaposed flat molds, resulting in a poor appearance of the product. Moreover, this method has the additional disadvantage of being inferior in productivity.

In Pricone et al. U.S. Pat. No. 4,486,363 (corresponding to Japanese Patent Laid-Open No. 140021/'84) and Pricone et al. U.S. Pat. No. 4,601,861 (corresponding to Japanese Patent Laid-Open No. 47237/'86), there are disclosed apparatus and methods for continuously embossing cube-corner prisms on one surface of thermoplastic synthetic resin sheeting. According to the embossing methods described in these patents, a portion of an embossing tool comprising an endless belt having a precision embossing pattern is heated to a temperature above the glass transition temperature of the thermoplastic synthetic resin. Thereafter, the thermoplastic synthetic resin sheeting is continuously embossed at a plurality of pressure points and then cooled to a temperature below the glass transition temperature of the thermoplastic synthetic resin in a cooling station.

However, in the methods described in these patents, the embossing temperature is limited to a temperature higher than the glass transition temperature of the synthetic resin and lower than the glass transition temperature of a carrier film. Consequently, the resin tends to have insufficient fluidity, and hence requires a long pressing time or a plurality of pressure points. Thus, these methods are not considered to be highly productive. Moreover, these methods have the disadvantage that the elements embossed under such temperature conditions show a reduction in shape accuracy owing to elastic deformation. Furthermore, since the embossing temperature is limited to a temperature higher than the glass transition temperature of the synthetic resin and lower than the glass transition temperature of a carrier film as described above, the choice of a carrier film is disadvantageously limited when high-melting synthetic resin sheeting made, for example, of a polycarbonate resin is to be embossed.

In Japanese Patent Laid-Open Nos. 159039/'81 and 159127/'81, there is disclosed a method in which synthetic resin sheeting is fed between a pair of endless belts and an array of optical elements such as lenticular lenses or Fresnel lenses is formed on one surface of the synthetic resin sheeting. However, these patents give no specific description of the melt viscosity conditions, heating conditions and cooling conditions which can be employed for the embossing of the synthetic resin. Moreover, the apparatus disclosed therein does not have a construction which enables the embossed synthetic resin to be stripped after sufficient cooling, and is not suitable for the formation of an array of optical elements having satisfactorily high optical accuracy.

In Japanese Patent Laid-Open No. 107502/'92, it is described that hologram sheeting is formed by extruding synthetic resin sheeting in a molten state from an extruder and, between a pair of elastic rolls and a cooling roll, pressing the sheeting against an endless stamper mounted on the cooling roll and another roll to emboss a diffraction grating. However, the pressed synthetic resin sheeting is not sufficiently cooled in the method described therein, so that it is difficult to form optical elements having a highly accurate shape according to this method. Moreover, this patent gives no specific description of the melt viscosity conditions, heating conditions and cooling conditions under which synthetic resin sheeting can be embossed to obtain a product having good shape quality.

Next, the problems encountered when an array of optical elements (e.g., cube-corner prisms) as described above is continuously formed on synthetic resin sheeting according to the above-described prior art methods are described below.

According to experiments conducted by the present inventors, the problems associated with the formation of an array of optical elements, which are expected to arise in the above-described prior art methods, include insufficient filling into the mold due to poor fluidity of the synthetic resin, elastic deformation after pressure release due to insufficient melting, shrinkage due to chemical linkages of the synthetic resin and/or evaporation of the solvent and low-molecular components in the synthetic resin, and the like.

Insufficient filling into the mold due to poor fluidity of the synthetic resin tends to occur especially when a synthetic resin is fed to an embossing tool in the form of sheeting having a relatively low temperature (e.g., in the vicinity of room temperature), because the synthetic resin cannot be sufficiently heated before or in a thermoforming zone. Especially in the methods described in Pricone et al. U.S. Pat. No. 4,486,363 (corresponding to Japanese Patent Laid-Open No. 140021/'84) and Pricone et al. U.S. Pat. No. 4,601,861 (corresponding to Japanese Patent Laid-Open No. 47237/'86), the temperature at which synthetic resin sheeting is embossed is limited so as to be higher than the glass transition temperature of the synthetic resin and lower than the glass transition temperature of a carrier film, so that the synthetic resin tends to have insufficient fluidity.

For this reason, Pricone et al. have employed a method in which a plurality of pressure points are provided or a method in which the traveling speed of the synthetic resin sheeting is reduced to provide a sufficient pressing time. However, neither of these methods is considered to be highly productive. Moreover, when a plurality of pressure points are carelessly provided, undesirable misalignment of the pattern may result because the synthetic resin sheeting separated from the mold is pressure-formed again at the next pressure point. Furthermore, as another improvement, a method in which a synthetic resin melted, for example, in an extruder is fed in the form of sheeting is also described therein. However, no specific description is given of the temperature conditions and synthetic resin melting conditions which can be employed to form a highly accurate array of optical elements.

Elastic deformation after pressure release due to insufficient melting tends to occur when an insufficiently melted synthetic resin is forcibly filled into a mold under high pressure. In this case, the synthetic resin is completely filled into the mold, but elastic deformation after pressure release tends to produce defects such as the swelling of the optical element-bearing surface so as to be convex rather than planar. Moreover, high-pressure forming under such conditions also has the disadvantage of shortening the life of the mold.

Deformation of the optical elements due to shrinkage of the synthetic resin is a phenomenon in which, during pressure forming or after pressure release, the optical element-bearing surface required to be essentially planar shrinks and deforms into a concave surface owing to chemical linkages, evaporation of the solvent and low-molecular components in the synthetic resin, and the like. This shrinking phenomenon tends to prevent the synthetic resin from being stripped from the mold and thereby cause a reduction in productivity. Moreover, when low-molecular components are contained in the synthetic resin, these low-molecular components tend to adhere to the surface of the mold and cause such troubles as poor strippability and a reduction in surface smoothness.

Furthermore, any volatile components remaining in the resulting embossed sheeting cause an additional trouble in that they gradually evaporate during use of the product to deform the optical elements and thereby detract from the performance of the product.

The present inventors have made investigations with a view to solving the above-described problems encountered when an array of optical elements is continuously formed on synthetic resin sheeting and, in particular, when an array of cube-corner type microprisms for use in the production of cube-corner type retroreflectors is continuously formed thereon. As a result, it has now been discovered that synthetic resin sheeting having an array of optical elements thereon and exhibiting high optical accuracy can be made with good productivity, by heating synthetic resin sheeting to a temperature in the flow temperature region of the synthetic resin, feeding the heated synthetic resin sheeting directly to a thermoforming zone of embossing means, continuously pressing the sheeting against a mold mounted on the embossing means and having a pattern for defining an array of optical elements while maintaining the sheeting at that flow temperature, to bring the sheeting into intimate contact with the mold and thereby form an array of optical elements on one surface of the sheeting, laminating a surfacing film to the side of the sheeting opposite to the mold as required, feeding a carrier film to the side of the resulting laminate opposite to the mold and bringing the carrier film into close contact therewith, and cooling the sheeting to a temperature lower than the glass transition temperature of the synthetic resin. The present invention has been completed on the basis of this discovery.

DISCLOSURE OF THE INVENTION

The present invention provides a method for continuously forming an array of optical elements which comprises feeding synthetic resin sheeting continuously, pressing said sheeting against a moving mold having a pattern for defining an array of optical elements in a thermoforming zone to bring said sheeting into intimate contact with said mold and thereby form an array of optical elements on one surface of said sheeting, moving said sheeting in engagement with said mold into a cooling zone where said sheeting is cooled to a temperature lower than the glass transition temperature of the synthetic resin, and stripping said sheeting from said mold, characterized in that (a) said synthetic resin sheeting having a temperature in its flow temperature region is directly fed to the thermoforming zone;

(b) in the thermoforming zone, the temperature of said synthetic resin sheeting is maintained in the flow temperature region of the synthetic resin; and (c) after said synthetic resin sheeting is brought into intimate contact with said mold, a carrier film is fed to the side of said sheeting opposite to said mold and brought into close contact therewith, and said sheeting is then cooled to a temperature lower than the glass transition temperature of the synthetic resin.

The present invention also provides apparatus for continuously forming an array of optical elements which comprises seamless embossing means provided on its outer surface with a mold having a pattern for defining an array of optical elements; heating means for heating said embossing means and thereby causing said embossing means to define a thermoforming zone; synthetic resin sheeting feed means for continuously feeding synthetic resin sheeting to the thermoforming zone of said embossing means; pressure forming means for pressing the fed synthetic resin sheeting against the mold provided on the outer surface of said embossing means and having a pattern for defining an array of optical elements in the thermoforming zone of said embossing means to bring the sheeting into intimate contact with the mold and thereby form an array of optical elements on one surface of the sheeting; drive means connected to said embossing means for moving the sheeting in engagement with the mold into a cooling zone; cooling means defining the cooling zone for cooling said embossing means and thereby reducing the temperature of the synthetic resin sheeting to a temperature lower than the glass transition temperature of the synthetic resin; and stripping means for stripping the synthetic resin sheeting having the array of optical elements formed thereon from the mold of said embossing means, characterized in that (a) said synthetic resin sheeting feed means includes heating means for raising the temperature of the fed sheeting to a temperature in the flow temperature region of the synthetic resin and can hence feed the synthetic resin sheeting having a temperature in its flow temperature region continuously and directly to the thermoforming zone of said embossing means;

(b) the temperature of the thermoforming zone of said embossing means is sufficient to maintain the temperature of the fed and pressure-formed synthetic resin sheeting in the flow temperature region of the synthetic resin; and (c) said apparatus further comprises carrier film feed means for feeding a carrier film to the side of the sheeting opposite to the mold after the synthetic resin sheeting is brought into intimate contact with the mold and before the sheeting is cooled to a temperature lower than the glass transition temperature thereof.

The present invention will be more specifically described hereinbelow.

Shape of Optical Elements and Method of Making a Master Mold for an Array of Optical Elements Specific examples of optical elements which can be formed according to the present invention include cube-corner prisms, linear prisms, lenticular lenses, refractive lenses, Fresnel lenses, linear Fresnel lenses and hologram patterns. Among others, cube-corner type microprisms which are useful in the production of cube-corner type retroreflectors (i.e., articles reflecting most of the incident light back toward the light source) are preferred.

In order to make a master mold for an array of optical elements (i.e., a basic mold required to form such an array of optical elements continuously on synthetic resin sheeting), various methods are known. They include, for example, a method in which optical elements are formed on a metallic surface by cutting grooves in a plurality of directions by such means as fly cutting, ruling or diamond turning [see, for example, Japanese Patent Laid-Open No. 100103/'85 (corresponding to U.S Pat. No. 4,588,258)]; and a method in which grooves are cut in one side face of a stack of metal or synthetic resin sheets, and the sheets are mutually shifted by the depth of the grooves and the pitch of the grooves to form a master mold for an array of optical elements (see, for example, U.S Pat. No. 4,073,568).

Moreover, a master mold for an array of cube-corner type microprisms suitable for use in the present invention can be made according to the method disclosed in PCT International Application No. PCT/JP96/02117 filed on Jul. 26, 1996. Specifically, this method comprises stacking a plurality of flat sheets having two mutually parallel major surfaces, cutting one side face of the resulting sheet stack so as to make V-shaped grooves in a direction perpendicular to the major surfaces and at a fixed pitch and thereby form a series of continuous roof-shaped projections having a vertical angle of about 90°, and shifting the sheets so that the vertices of the roof-shaped projections formed on each sheet meet the bottoms of the V-shaped grooves formed on an adjacent sheet, and is characterized in that the sheets used therefor have a thickness of 50 to 500 $\mu$m and the sheets are formed of a synthetic resin having a Rockwell hardness of not less than 70.

No particular limitation is placed on the type of the synthetic resin used for the synthetic resin sheeting on which an array of optical elements is formed according to the present invention, so long as the resin has high transparency. Specific examples thereof include acrylic resins, polyester resins, polycarbonate resins, vinyl chloride resin, polystyrene resin, polyurethane resins and polyolefin resins. Among others, acrylic resins, polycarbonate resins, vinyl chloride resin and polyurethane resins are preferred from the viewpoint of weather resistance, transparency and the like.

Method of Making Embossing Means

Using the master mold on which such an array of optical elements are formed, a multiplicity of reversed molds usable in the forming of synthetic resin sheeting can be reproduced according to a per se known technique such as electroforming [see, for example, "Special Electroforming and Its Application—Materials and Chemicals Used for Electroforming", Manabu Inoue, Practical Surface Techniques, 35(8), 10–16(1988)]. Moreover, these molds reproduced by electroforming can be joined together to make a large-sized mold. Thus, after a large sheet-like mold is made by joining a plurality of reproduced molds together, both ends thereof can be joined, for example, by laser welding to form a seamless belt-like mold (or an embossing belt) for embossing synthetic resin sheeting to form an array of optical elements on a surface thereof.

Alternatively, according to, for example, the method described in Japanese Utility Model Publication No. 1072/'73, a seamless belt-like mold can be made by mounting a plurality of molds reproduced by electroforming as described above, on the inside surface of a rotary drum type electrode without leaving any space between the molds, and performing further electroforming.

Although no limitation is placed on the thickness of the belt-like mold, it is usually preferable that its thickness is in the range of $\frac{1}{3,000}$ to $\frac{1}{500}$, more preferably $\frac{1}{1,200}$ to $\frac{1}{800}$, of the diameter of the rolls used.

Moreover, there can also be used an embossing means of the embossing roll type in which a mold for an array of optical elements is directly mounted on the surface of a roll. In the case of linear optical elements such as linear prisms, linear Fresnel lenses and lenticular lenses, this embossing means of the embossing roll type is preferred because a pattern of elements can be directly cut in the surface of the roll.

Method and Means for Feeding Synthetic Resin Sheeting

There are several methods for feeding synthetic resin sheeting having a temperature in its flow temperature region to the apparatus for continuously forming an array of optical elements in accordance with the present invention. They include, for example, a method of feeding synthetic resin sheeting having a temperature in its flow temperature region directly to the thermoforming zone by use of a melt extruder or the like; and a method of feeding previously formed synthetic resin sheeting to the thermoforming zone after heating the sheeting to a temperature in or above its flow temperature region by preheating means.

As a specific method using an extruder, it is common practice to extrude a molten synthetic resin through a coat-hanger type extrusion die attached to a single-screw extruder. By way of example, the screw of the extruder may have a diameter/length ratio of 1/20 to 1/35, a compression ratio of 1.5 to 2.0, and a rotational speed of about 20 to 100 rpm. Moreover, according to the properties of the synthetic resin, a vacuum vent, a gear pump feeder and the like may be used in combination. Furthermore, in order to improve the thickness accuracy of the sheeting, it is possible to install a pair of calender rolls immediately before the thermoforming zone to which synthetic resin sheeting is fed. Usable calender rolls are ones having a diameter of about 100 to 500 mm. Metal rolls having a specular surface are preferred, and it is more preferable that they have a structure capable of internal heating. It is also desirable to control the clearance between the calender rolls so that the desired thickness of the synthetic resin sheeting will be obtained.

On the other hand, an example of the method of feeding previously formed synthetic resin sheeting to the thermoforming zone after heating the sheeting to a temperature in or above its flow temperature region is one in which the formed synthetic resin sheeting is heated to a temperature in or above its flow temperature region by passing it between two or more heating rolls. In this method, indirect heating devices such as a hot blast heater, a near-infrared lamp heater and a far-infrared lamp heaters may be used in combination.

Thermoforming Zone and Heating Means

The synthetic resin sheeting having a temperature in its flow temperature region, which has been fed directly to the thermoforming zone of the apparatus for continuously forming an array of optical elements by the above-described method and means of feeding the synthetic resin sheeting, is pressed against the mold having a pattern for defining an array of optical elements by pressure forming means and brought into intimate contact with the mold. Then, the synthetic resin sheeting continues to travel through the thermoforming zone while remaining in engagement with the mold, so that an array of optical elements is formed on one surface of the sheeting.

The pressure forming means may comprise, for example, at least one pressure roll disposed so as to be opposite to the above-described embossing belt or embossing roll. A roll made of metal, rubber or synthetic resin can be used as the pressure roll, and the pressure applied during pressing is not strictly limited because it depends on the type of the synthetic resin constituting the sheeting, the shape of the mold, and the like. However, it is usually preferable that the pressure is in the range of 5 to 100 kg/cm, more preferably about 20 to 60 kg/cm, with respect to the width of the roll. By way of example, the speed of continuous pressure forming may generally be in the range of 5 to 30 m/min and preferably 7 to 15 m/min. A plurality of rolls can be used according to the size of the optical elements, the pressure and speed of forming, and the like.

As the heating means, there can be used an internal heating method in which heat is supplied from the inside of the roll. The heat supply means may comprise one of the dielectric heating type, the heat transfer medium circulation type or the like. Moreover, as auxiliary means, indirect heating devices such as a hot blast heater, a near-infrared lamp heater and a far-infrared lamp heater can also be used in combination. For example, when an embossing belt is used, the thermo-forming zone can be formed by using a heating roll as one of the rolls on which the belt is mounted. Alternatively, when an embossing roll or the like is used, this can be accomplished by defining a heating zone in half of the roll. Furthermore, after the formed synthetic resin sheeting (or laminate thereof) is stripped as will be described later, the belt may be preheated by an auxiliary heating means as required.

Flow Temperature Region

The term "flow temperature region" as used herein means a temperature region in which synthetic resin sheeting becomes molten and, when pressed against a mold having a pattern for defining an array of optical elements, can flow in conformity with the shape of the mold and thereby fill and engage the mold. Thus, this flow temperature region makes it possible to overcome the previously described disadvantages which have frequently been encountered in the prior art, such as insufficient filling into the mold due to poor fluidity of the synthetic resin, and elastic deformation after pressure release due to insufficient melting.

More specifically, the flow temperature region ranges from the temperature at which the synthetic resin has a melt viscosity of not greater than 100,000 poises and preferably not greater than 50,000 poises, to less than the decomposition temperature of the synthetic resin. The melt viscosity of the synthetic resin can be measured according to a temperature-rise test using a Koka type flow tester as described in JIS K-7210, and the flow temperature region can be determined from the temperature-viscosity relationship thus obtained.

According to a specific procedure based on the temperature-rise test, a 1.5 g sample of the synthetic resin is placed in a metallic cylinder having a cross-sectional area of 1 $cm^2$ and fitted with a die having an orifice diameter of 1.0 mm and a length of 10 mm and adjusted to a starting temperature of 140° C., and extruded under an applied force of 30 kgf while being heated at a rate of temperature rise of 3° C./min. Then, the melt viscosity of the synthetic resin can be determined from the relationship between the temperature of the sample and the extrusion rate so measured.

The temperature of the synthetic resin sheeting located in the thermoforming zone can be measured, for example, with an infrared thermometer.

Lamination of Surfacing Film

For the synthetic resin sheeting which has been pressure-formed so as to come into intimate contact with the mold and thereby engage the mold and which now has an array of optical elements formed on one surface thereof, a surfacing film can be laminated to the surface of the sheeting opposite to the mold (hereinafter also referred to as the outer surface) as required, in order to improve its properties such as weather resistance, solvent resistance, stain resistance, cleaning resistance, flexibility, cold resistance, mar resistance, abrasion resistance and flexing resistance. The means of lamination may comprise, for example, a rubber roll disposed so as to be opposite to the embossing belt. The surfacing film is guided by rubber rolls, fed to the synthetic resin sheeting having a temperature at least equal to or higher than the flow starting temperature and preferably in the flow temperature region, and laminated thereto by thermocompression bonding with a rubber roll. In this step, the surfacing film is preferably laminated by heat fusion bonding at a temperature equal to or higher than its glass transition temperature.

The term "flow starting temperature" as used herein means the temperature at which, when a resin that is solid at ordinary temperatures is heated beyond its glass transition temperature, it softens and then begins to flow to such an extent as to permit pressure forming. More specifically, it means the temperature at which the synthetic resin has a melt viscosity of not greater than 1,000,000 poises.

The materials which can be used for the surfacing film laminated to the outer surface of the synthetic resin sheeting for the above-described purpose include, for example, acrylic resins, fluorine containing resins, vinyl chloride resin, polyester resins and polyurethane resins. Although no particular limitation is placed on the thickness of the surfacing film, it may generally be in the range of 10 to 100 μm and preferably about 20 to 50 μm.

If necessary, the surfacing film can be printed with logos, traffic signs or the like. The printing is preferably made on the back side of the surfacing film (i.e., that side of the surfacing film which comes into contact with the synthetic resin sheeting) so that the printing ink may not be removed.

Lamination of Carrier Film

For the synthetic resin sheeting which has been pressure-formed in the above-described manner so as to come into intimate contact with the mold and may further have a surfacing film optionally laminated to the outer surface thereof, a carrier film is fed and laminated to the side of the sheeting opposite to the mold, immediately before the sheeting in engagement with the mold passes into the cooling zone. The means of laminating the carrier film may comprise, for example, a roll (e.g., rubber roll) disposed so as to be opposite to the embossing belt. The carrier film is guided by rubber rolls, fed to the outer surface of the synthetic resin sheeting having a temperature at least equal to or higher than the flow starting temperature, or the surface of the optionally laminated surfacing film opposite to the sheeting, and laminated thereto by thermocompression bonding with a roll.

Thus, when the carrier film is pressed against and laminated to the outer surface of the synthetic resin sheeting which has been melted, brought into intimate contact with the mold and thereby engaged the mold, or the surface of the optionally laminated surfacing film opposite to the synthetic resin sheeting, the mating surface of the carrier film is transcribed to the outer surface of the synthetic resin sheeting or the outer surface of the surfacing film, so that a smooth surface can be produced. Moreover, the carrier film also functions as a protective layer serving, for example, to protect the product surface from being marred during manufacture. Since cooling is started immediately after the carrier film is laminated to the synthetic resin sheeting or the surfacing film, it is possible to use a synthetic resin film having a flow temperature almost equal to that of the synthetic resin sheeting or the surfacing film.

Specific and preferred examples of the synthetic resin which can be used for the carrier film include resins having relatively high thermal resistance, such as polyethylene terephthalate resin, polyimide resins and aramid resins. However, synthetic resins having a glass transition temperature almost equal to that of the synthetic resin used for the synthetic resin sheeting can also be used.

Although no particular limitation is placed on the thickness of the carrier film, it may generally be in the range of 35 to 150 μm and preferably about 50 to 100 μm.

Cooling Zone and Cooling Means

Since the temperature used for thermocompression bonding of the carrier film is almost equal to the temperature at which the synthetic resin sheeting is pressed against the mold so as to come into intimate contact with the mold and thereby engage the mold, it is necessary to establish a cooling zone for rapidly cooling the laminate immediately after its lamination so that the carrier film may not be melted. The cooling means used in the cooling zone may comprise, for example, a method in which cooling medium blowing nozzles for blowing a cooling medium (e.g., air, nitrogen gas or water) upon one surface or both surfaces of the beltlike mold (or embossing belt) are disposed at positions downstream of the carrier film laminating means; a method in which one of the two rolls having the embossing belt mounted thereon is designed as a heating roll (or thermorforming zone) as described above and the other is designed as a cooling roll which is cooled with a medium such as water; or a combination of these two methods. In this case, the cooling zone is defined by the cooling roll and the region of the embossing belt in which the cooling medium blowing nozzles are disposed. In a forming means comprising a roll provided on its surface with a pattern for defining an array of optical elements (e.g., the above-described embossing roll), it is also possible to define the cooling zone in half of the roll. In this case, the two temperature zones (i.e., the thermoforming zone and the cooling zone) can be established on the roll by dividing a plurality of passages formed in the roll into two groups with the aid of two manifolds and passing heating and cooling media through the respective manifolds.

In the above-described cooling zone, the laminate of the synthetic resin sheeting and the carrier film, or the laminate of the synthetic resin sheeting, the surfacing film and the carrier film, is cooled to a temperature lower than the glass transition temperature (Tg) of the synthetic resin, preferably lower than [Tg(°C.)−20° C.], and more preferably lower than [Tg(°C.) −50° C.].

Stripping Means

The cooled laminate of the synthetic resin sheeting and the carrier film or the cooled laminate of the synthetic resin sheeting, the surfacing film and the carrier film (which may hereinafter be referred to briefly as the sheet laminate) can be stripped from the mold by a common means such as a stripping roll. The stripping roll is preferably disposed so as not to be in contact with the cooling roll, so that the cooled sheet laminate to be stripped from the mold may not be pressed against the cooling roll by the stripping roll. As the stripping roll, there can be used, for example, a rubber roll, a metal roll or a synthetic resin roll.

After-treatments

The synthetic resin optical sheeting having an array of optical elements formed thereon in the above-described manner is used as a product after the carrier film is stripped. However, if necessary, back sheeting may be disposed to create a capsular structure for the purpose of securing a layer of air on the surface of the optical sheeting on which the array of optical elements is formed. This can be accomplished, for example, by heat-embossing the back sheeting from the back side thereof (i.e., the side opposite to the optical sheeting) to form a reticulated connecting wall having the shape of intersected continuous thin lines and thereby bonding the back sheeting partly to the surface of the optical sheeting on which the array of optical elements is formed. Moreover, a light-reflecting mirror layer may be formed on the surface of the array of optical elements of the optical sheeting by metal vapor deposition, chemical silver plating or other technique, and/or an adhesive layer or the like may be applied to the back side of the back sheeting or to the mirror layer formed on the surface of the array of optical elements for the purpose of joining the product to other structures.

The method and apparatus for continuously forming an array of optical elements in accordance with the present invention will be more specifically explained with reference to the accompanying drawings.

Figure 1:
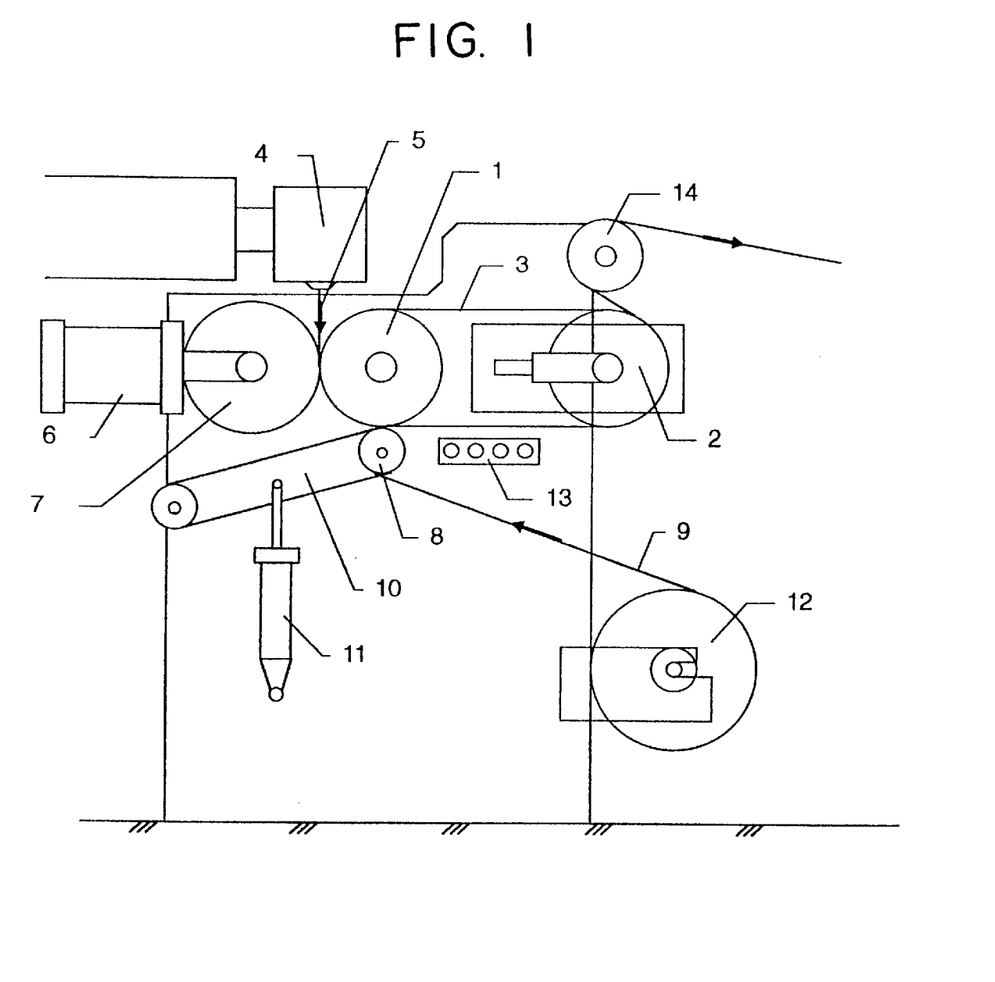
FIG. 1 is a schematic view illustrating one embodiment of the apparatus for continuously forming an array of optical elements in accordance with the present invention.

In the embodiment illustrated in FIG. 1, a circular seamless embossing belt 3 is mounted on two steel rolls 1 and 2. Roll 1 is a thermoforming roll having therein a heating means of the oil circulation type and thereby defining a thermoforming zone. Roll 2 is a cooling roll having therein a cooling means for cooling by use of a cooling medium and thereby defining the main part of a cooling zone. Moreover, seamless embossing belt 3 is provided on its surface with a mold having a pattern for defining an array of optical elements.

Synthetic resin sheeting 5 is continuously extruded through an extrusion die 4 attached to an extruder while being maintained at a temperature in its flow temperature region, and fed to a gap between a pressure-forming rubber roll 7 biased by means of an oil-hydraulic cylinder 6, and the surface of embossing belt 3 on roll 1 located in the thermoforming zone. Thus, synthetic resin sheeting 5 is pressed against the mold provided on the surface of the embossing belt and having a pattern for defining an array of optical elements, and brought into intimate contact therewith, so that sheeting 5 engages the mold and, at the same time, an array of optical elements is formed on one surface of sheeting 5.

Synthetic resin sheeting 5, which is now in engagement with the mold, travels through the thermoforming zone together with embossing belt 3. At a position near the end of the thermoforming zone, carrier sheeting 9 is fed to the outer surface of sheeting 5 and compressed with a laminating pressure roll 8 made of rubber. Thus, carrier sheeting 9 is laminated to synthetic resin sheeting 5 and, at the same time, the formation of an array of optical elements is completed. Roll 8 is biased by means of an air cylinder 11 through the medium of a metallic arm 10 rotatably supported at a supporting point, and carrier sheeting 9 is wound off by an unwinder 12.

The laminate of carrier sheeting 9 and synthetic resin sheeting 5, which travels together with embossing belt 3 while remaining in engagement with the mold, then passes into the cooling zone where it is cooled with an air blast cooler 13 and further cooled to a temperature lower than the glass transition temperature of the synthetic resin on roll 2 constituting the main part of the cooling zone. The cooled sheet laminate is stripped from the endless belt by means of a stripping roll 14 and wound up as a product.

Figure 2:
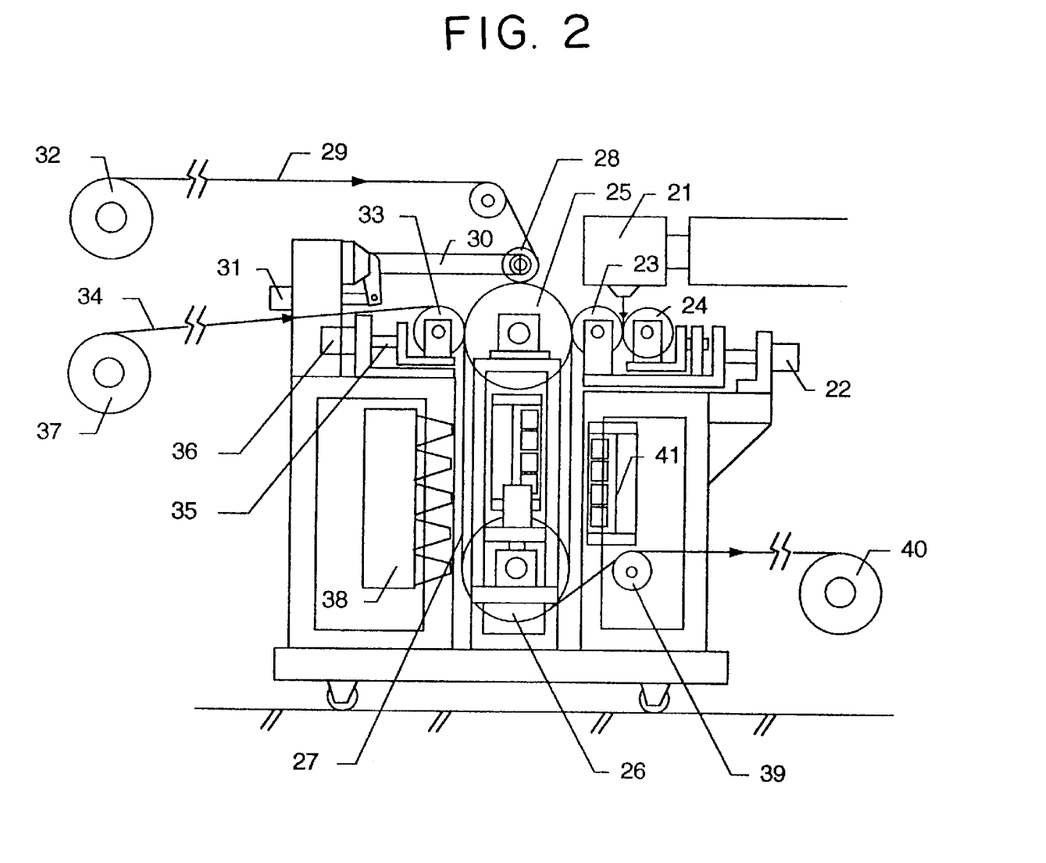
FIG. 2 is a schematic view illustrating another embodiment of the apparatus for continuously forming an array of optical elements in accordance with the present invention.

In the embodiment illustrated in FIG. 2, an endless belt 27 is mounted on two steel rolls 25 and 26. Roll 25 is a thermoforming roll having therein a heating means of the dielectric heating type and thereby defining a thermoforming zone. Roll 26 is a cooling roll having therein a cooling means for cooling by use of a cooling medium and thereby defining the main part of a cooling zone. Moreover, seamless embossing belt 27 is provided on its surface with a mold having a pattern for defining an array of optical elements.

Synthetic resin sheeting is continuously extruded through an extrusion die 21 attached to an extruder while being maintained at a temperature in its flow temperature region, and fed to a gap between a pair of steel calender rolls 23 and 24 biased by means of an oil-hydraulic cylinder 22. Then, the synthetic resin sheeting travels around calender roll 23 and is pressed by calender roll 23 against embossing belt 27 located in the thermoforming zone. Thus, the synthetic resin sheeting is brought into intimate contact with the mold provided on the surface of the embossing belt and having a pattern for defining an array of optical elements, so that the sheeting engages the mold and, at the same time, an array of optical elements is formed on one surface of the sheeting. In this step, intimate contact may be completed by disposing a pressure roll adjacent to calender roll 23, if desired.

The synthetic resin sheeting, which is now in engagement with the mold, travels through the thermoforming zone together with embossing belt 27. In the thermoforming zone, a surfacing film 29 is fed to the outer surface of the sheeting and compressed with a laminating pressure roll 28 made of rubber, so that surfacing film 29 is laminated to the synthetic resin sheeting. Roll 28 is biased by means of an air cylinder 31 through the medium of a metallic arm 30, and surfacing film 29 is wound off by an unwinder 32.

The laminate of the synthetic resin sheeting and surfacing film 29, which travels together with embossing belt 27 while remaining in engagement with the mold, further passes through the thermoforming zone. At a position near the end of the thermoforming zone, carrier sheeting 34 is fed to the outer surface of the laminated surface film and compressed with a laminating pressure roll 33 made of rubber. Thus, carrier sheeting 34 is laminated to the surface of the surfacing film opposite to the synthetic resin sheeting and, at the same time, the formation of an array of optical elements is completed. Roll 33 is biased by means of an air cylinder 36 through the medium of a metallic arm 35, and carrier sheeting 34 is wound off by an unwinder 37.

The sheet laminate composed of the synthetic resin sheeting, surfacing film 29 and carrier sheeting 34 then passes into the cooling zone where it is cooled with an air blast cooler 38 and further cooled to a temperature lower than the glass transition temperature of the synthetic resin on roll 26 constituting the main part of the cooling zone. The cooled sheet laminate is stripped from endless belt 27 by means of a stripping roll 39 and wound up as a product by a winder 40. Endless belt 27, from which the sheet laminate has been stripped, travels along a preheater 41 of the near-infrared heating type for preheating it to the pressing temperature, and then returns to a gap between rolls 25 and 23.

Figure 3:
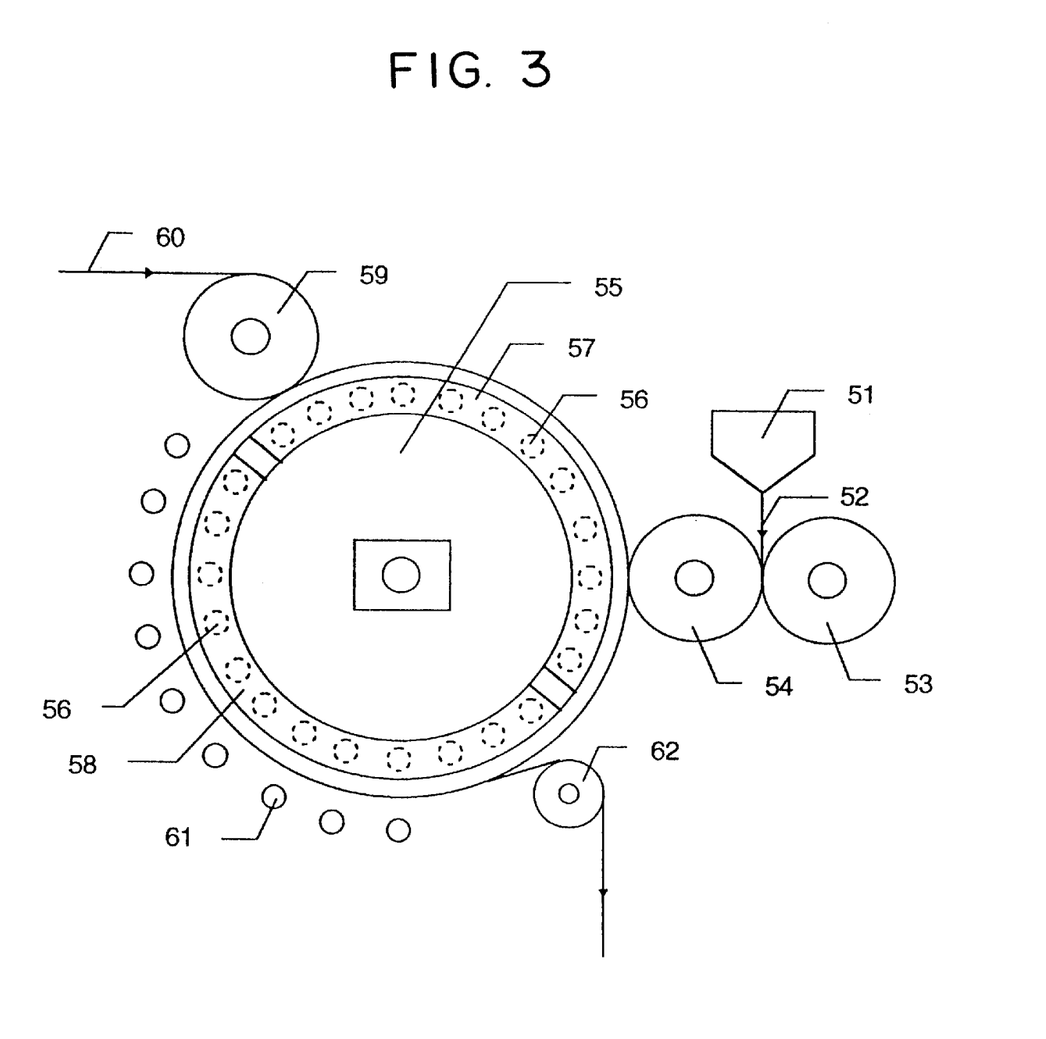
FIG. 3 is a schematic view illustrating still another embodiment of the apparatus for continuously forming an array of optical elements in accordance with the present invention.

In the embodiment illustrated in FIG. 3, an embossing roll 55 has a structure in which heat exchange can be effected by passing a heat transfer medium through its internal passages 56, and is divided into two sections by manifolds 57 and 58 mounted on the peripheral part of the roll. A heated heat transfer oil is passed through the passages in the upper part of roll 55 by way of heating manifold 57 to define a thermo-forming zone, while cooling water is passed through the passages in the lower part of roll 55 by way of cooling manifold 58 to define a cooling zone. Thus, embossing roll 55 is divided into the two temperature zones. Moreover, embossing roll 55 is provided on its surface with a mold having a pattern for defining an array of optical elements.

Synthetic resin sheet 52 is continuously extruded through an extrusion die 51 attached to an extruder while being maintained in its flow temperature region, and fed to a gap between a pair of steel calender rolls 53 and 54 and compressed thereby. Then, synthetic resin sheeting 52 travels around calender roll 54 and is pressed by calender roll 54 against the thermoforming zone of embossing roll 55. Thus, synthetic resin sheeting 52 is brought into intimate contact with the mold provided on the surface of embossing roll 55 and having a pattern for defining an array of optical elements, so that the sheeting engages the mold and, at the same time, an array of optical elements are formed on one surface of the sheeting.

Synthetic resin sheeting 52, which is now in engagement with the mold, travels with the rotation of embossing roll 55. At the end of the thermoforming zone of embossing roll 55, carrier sheeting 60 is fed to the outer surface of sheeting 52 and compressed with a laminating roll 59. Thus, carrier sheeting 60 is laminated to sheeting 52 and, at the same time, the formation of an array of optical elements is completed. As a result of rotation, the resulting laminate of synthetic resin sheeting 52 and carrier sheeting 60 then passes into the cooling zone of embossing roll 55 where it is rapidly cooled. In addition, the surface of the laminate is also cooled with an air blast cooler 61. Thus, the laminate is cooled to a temperature lower than the glass transition temperature of the synthetic resin. The cooled sheet laminate is stripped by means of a stripping roll 62 and wound up as a product.

In the above-described forming method of the present invention, optical elements are formed by pressure forming in the flow temperature region of the synthetic resin. Accordingly, the disadvantages which have frequently been encountered in the prior art, such as insufficient filling into the mold due to poor fluidity of the resin, elastic deformation after pressure release due to insufficient melting, and shrinkage due to chemical linkages of the resin and/or evaporation of the solvent, can be overcome, so that an array of optical elements having a very high degree of optical accuracy can be formed.

Moreover, the apparatus of the present invention makes it possible to achieve the quick filling of synthetic resin sheeting into a mold and thereby improve the productivity of an array of optical elements markedly.

EXAMPLE

The present invention is further illustrated by the following example.

Example 1

A specific example in which an array of optical elements in accordance with the present invention was continuously formed by use of an apparatus as illustrated in FIG. 2 is given below.

In FIG. 2, an endless belt 27 having a perimeter of 4000 mm and a width of 700 mm was mounted on a pair of steel rolls 25 and 26 having a diameter of 300 mm and a width of 800 mm. Upper roll 25 could be heated to 280° C. with a dielectric heating means disposed therein. On the other hand, lower roll 26 had a cooling means therein for cooling with water so as to give a surface temperature of 30° C. Seamless embossing belt 27 was mounted on this pair of rolls, and the belt was provided on its surface with a pattern of cube-corner retroreflective elements having a prism height of 100 $\mu$m and an optical axis tilt angle of 8° and comprising trigonal prism cavities arranged in a closest packed state over a width of 600 mm.

A polycarbonate resin (manufactured by Mitsubishi Engineering Plastics Co., Ltd.) was extruded at a temperature of 280° C. through a 650 mm wide coathanger type extrusion die 21 attached to a single-screw extruder having a diameter of 50 mm. The resulting 250 $\mu$m thick polycarbonate resin sheeting was passed between a pair of chrome-plated rolls 23 and 24 having a surface temperature of 180° C. and biased by means of an oil-hydraulic cylinder 22, and then fed to the above-described belt apparatus where the sheeting was brought into intimate contact with the embossing belt of the belt apparatus under an applied linear pressure of 50 kg/cm. Moreover, the polycarbonate resin sheeting traveling together with the belt was pressed again under an applied pressure of 30 kg/cm by means of a silicone roll (not shown) having a diameter of 200 mm and a width of 700 mm.

Thereafter, a 30 $\mu$m thick acrylic resin film (manufactured by Mitsubishi Rayon Co., Ltd.) 29 was laminated to the polycarbonate resin sheeting by means of a silicone roll 28 having a diameter of 200 mm and a width of 700 mm. While this polycarbonate resin sheeting 29 having the acrylic resin film fusion-bonded thereto was advancing together with the embossing belt, 75 $\mu$m thick polyethylene terephthalate resin sheeting 34 was further laminated to the overlying acrylic resin film by means of a silicone roll 33 having a diameter of 200 mm and a width of 700 mm.

The above-described sheet laminate was immediately cooled to 50° C. or below with a cooler 38 having nozzles for blowing an air blast at 20° C., and then stripped from lower cooling roll 26. Thus, there was obtained an array of optical elements in which one surface of polycarbonate resin sheeting is laminated with an acrylic resin film and protected with polyethylene terephthalate sheeting and the other surface thereof is provided with a multiplicity of cube-corner type retroreflective elements in the form of trigonal pyramids.

When the appearance of elements in the array of optical elements thus obtained was observed at a magnification of 1,000 diameters using a scanning electron microscope, it was confirmed that the reflective faces of the elements were very smooth and the apices and edges of the elements are uniformly and sharply shaped without suffering any defect. Moreover, when the retroreflectivity of this array of optical elements was measured at an angle of incidence of 5° and an angle of observation of 0.2° according to JIS Z8714 "Retroreflector —Optical properties—Measuring method", it exhibited a very excellent value of 880 cd/lx·cm$^2$.

We claim:

1. A method for continuously forming an array of optical elements which comprises feeding synthetic resin sheeting continuously, pressing said sheeting against a moving mold having a pattern for defining an array of optical elements in a thermoforming zone to bring said sheeting into intimate contact with said mold and thereby form an array of optical elements on one surface of said sheeting, moving said sheeting in engagement with said mold into a cooling zone where said sheeting is cooled to a temperature lower than the glass transition temperature of the synthetic resin, and stripping said sheeting from said mold, characterized in that (a) said synthetic resin sheeting having a temperature in its flow temperature region is directly fed to the thermoforming zone;

(b) in the thermoforming zone, the temperature of said synthetic resin sheeting is maintained in the flow temperature region of the synthetic resin; and (c) after said synthetic resin sheeting is brought into intimate contact with said mold, a carrier film is fed to the side of said sheeting opposite to said mold and brought into close contact therewith, and said sheeting is then cooled to a temperature lower than the glass transition temperature of the synthetic resin.

2. A method as claimed in claim 1 wherein, after said synthetic resin sheeting is brought into intimate contact with said mold and while the synthetic resin has a temperature at least equal to or higher than its flow starting temperature, a surfacing film is fed and laminated to the side of said sheeting opposite to said mold in the thermoforming zone, and said carrier film is then fed to the side of the resulting laminate opposite to said mold.

3. A method as claimed in claim 1 wherein the flow temperature region of the synthetic resin ranges from the temperature at which the synthetic resin has a melt viscosity of not greater than 100,000 poises to less than the decomposition temperature of the synthetic resin.

4. A method as claimed in claim 1 wherein, after said synthetic resin sheeting is brought into intimate contact with said mold, said carrier film is fed while the synthetic resin has a temperature at least equal to or higher than its flow starting temperature.

5. A method as claimed in claim 1 wherein the synthetic resin is an acrylic resin, a polyester resin, a polycarbonate resin, vinyl chloride resin, polystyrene resin, a polyolefin resin or a polyurethane resin.

6. A method as claimed in claim 1 wherein said mold is a mold in the form of a belt or roll.

7. A method as claimed in claim 1 wherein the array of optical elements comprises cube-corner prisms, linear prisms, lenticular lenses, refractive lenses, Fresnel lenses, linear Fresnel lenses or hologram patterns.

8. Apparatus for continuously forming an array of optical elements which comprises seamless embossing means provided on its outer surface with a mold having a pattern for defining an array of optical elements; heating means for heating said embossing means and thereby causing said embossing means to define a thermo-forming zone; synthetic resin sheeting feed means for continuously feeding synthetic resin sheeting to the thermoforming zone of said embossing means; pressure forming means for pressing the fed synthetic resin sheeting against the mold provided on the outer surface of said embossing means and having a pattern for defining an array of optical elements in the thermoforming zone of said embossing means to bring the sheeting into intimate contact with the mold and thereby form an array of optical elements on one surface of the sheeting; drive means connected to said embossing means for moving the sheeting in engagement with the mold into a cooling zone; cooling means defining the cooling zone for cooling said embossing means and thereby reducing the temperature of the synthetic resin sheeting to a temperature lower than the glass transition temperature of the synthetic resin; and stripping means for stripping the synthetic resin sheeting having the array of optical elements formed thereon from the mold of said embossing means, characterized in that (a) said synthetic resin sheeting feed means includes heating means for raising the temperature of the fed sheeting to a temperature in the flow temperature region of the synthetic resin and can hence feed the synthetic resin sheeting having a temperature in its flow temperature region continuously and directly to the thermoforming zone of said embossing means;

(b) the temperature of the thermoforming zone of said embossing means is sufficient to maintain the temperature of the fed and pressure-formed synthetic resin sheeting in the flow temperature region of the synthetic resin; and (c) said apparatus further comprises carrier film feed means for feeding a carrier film to the side of the sheeting opposite to the mold after the synthetic resin sheeting is brought into intimate contact with the mold and before the sheeting is cooled to a temperature lower than the glass transition temperature thereof.

9. Apparatus as claimed in claim 8 which, in the thermoforming zone of said embossing means, further comprises surfacing film feed means for feeding a surfacing film to the side of the sheeting opposite to the mold after the synthetic resin sheeting is brought into intimate contact with the mold and before the carrier film is fed, and laminating means for laminating the surfacing film to the sheeting.

10. Apparatus as claimed in claim 8 wherein said embossing means comprises an embossing belt.

11. Apparatus as claimed in claim 8 wherein said embossing means comprises an embossing roll.

12. Apparatus as claimed in claim 8 wherein the synthetic resin sheeting feed means comprises a melt extruder for synthetic resins.

* * * * *